United States Patent
Lee et al.

(10) Patent No.: US 9,185,818 B2
(45) Date of Patent: Nov. 10, 2015

(54) DISPLAY APPARATUS

(71) Applicant: SAMSUNG ELECTRONICS CO., LTD., Suwon-si (KR)

(72) Inventors: Min Hee Lee, Seoul (KR); Sung Gi Kim, Suwon-si (KR); Hyun Choul Kim, Hwaseong-si (KR); Naoya Edahiro, San Francisco, CA (US); Noah Murphy-Reinhertz, San Francisco, CA (US); Angie Tadeo, Oakland, CA (US); Yves Behar, San Francisco, CA (US); Joshua Tree Morenstein, San Francisco, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 261 days.

(21) Appl. No.: 13/727,084

(22) Filed: Dec. 26, 2012

(65) Prior Publication Data

US 2013/0163163 A1    Jun. 27, 2013

Related U.S. Application Data

(60) Provisional application No. 61/579,273, filed on Dec. 22, 2011.

(30) Foreign Application Priority Data

Dec. 14, 2012   (KR) ........................ 10-2012-0146352

(51) Int. Cl.
*H05K 7/00* (2006.01)
*F16M 11/10* (2006.01)
*F16M 11/20* (2006.01)
(Continued)

(52) U.S. Cl.
CPC ................. *H05K 7/00* (2013.01); *F16M 11/10* (2013.01); *F16M 11/2014* (2013.01); *F16M 11/2092* (2013.01); *F16M 11/24* (2013.01); *H04N 5/64* (2013.01); *F16M 2200/08* (2013.01)

(58) Field of Classification Search
CPC ....... G06F 1/16; G06F 1/1601; G06F 1/1607; G06F 1/1641; G06F 1/1652; G06F 2200/1612; G06F 2200/1633
USPC ............. 361/679.21, 679.22, 679.23, 679.24, 361/679.25; 349/58, 60
See application file for complete search history.

(56) References Cited

U.S. PATENT DOCUMENTS 5,295,089 A * 3/1994 Ambasz ................... 361/679.09
6,144,550 A * 11/2000 Weber et al. ............. 361/679.26
6,856,504 B2 * 2/2005 Zheng ...................... 361/679.23
(Continued)

FOREIGN PATENT DOCUMENTS

DE    202009014369 U1    3/2011

OTHER PUBLICATIONS

Communication dated Jul. 7, 2014 issued by European Patent Office in counterpart European application No. 12197908.2.
(Continued)

*Primary Examiner* — Anthony Haughton
(74) *Attorney, Agent, or Firm* — Sughrue Mion, PLLC

(57) ABSTRACT

A display apparatus including a support configured to support a display unit, and a cover formed of a flexible sheet and configured to cover the support, thereby improving the external appearance of the rear side of the display apparatus through the cover.

22 Claims, 10 Drawing Sheets

(51) Int. Cl.
*F16M 11/24* (2006.01)
*H04N 5/64* (2006.01)

(56) References Cited

U.S. PATENT DOCUMENTS

| | | | |
|---|---|---|---|
| 7,697,272 B2* | 4/2010 | Choi | 361/679.21 |
| 7,907,391 B2* | 3/2011 | Park et al. | 361/679.21 |
| 8,199,490 B2* | 6/2012 | Wilkenfeld | 361/679.55 |
| 8,355,245 B2* | 1/2013 | Park et al. | 361/679.21 |
| 8,854,801 B2* | 10/2014 | Bergeron et al. | 361/679.21 |
| 2004/0169995 A1* | 9/2004 | Ghosh et al. | 361/683 |
| 2004/0218349 A1* | 11/2004 | Zheng | 361/679 |
| 2006/0087596 A1 | 4/2006 | Park et al. | |
| 2009/0121098 A1 | 5/2009 | Chao et al. | |

OTHER PUBLICATIONS

Communication issued on Mar. 27, 2015 by the Australian Intellectual Property Office in related Application No. 2012268913.

Communication dated May 26, 2015, issued by the Mexican Institute of Industrial Property in counterpart Mexican Application No. MX/a/2012/015153.

* cited by examiner

DISPLAY APPARATUS

CROSS-REFERENCE TO RELATED APPLICATION

This application claims the benefit of U.S. Patent Application No. 61/579,273 filed on Dec. 22, 2011 and priority from Korean Patent Application No. 10-2012-0146352, filed on Dec. 14, 2012 in the Korean Intellectual Property Office, the disclosures of which are hereby incorporated herein by reference.

BACKGROUND

1. Field

Exemplary embodiments of the present disclosure relate to a display apparatus provided with a display unit on which a screen is displayed.

2. Description of the Related Art

In general, a display apparatus refers to an apparatus including a display unit, on which an image is displayed, and the display apparatus may include a television or a monitor.

The display apparatus includes a display unit, on which a screen is displayed, and a stand to support the display unit while being mounted on a horizontal surface, such as an upper surface of a desk.

The display apparatus as such may be used in an open-type office space configured to enhance a cooperative working environment with company members. In an open-type office space, a rear side of the display is easily exposed and observed by people as well as a front side thereof.

Accordingly, the appearance of the rear side of the display apparatus is becoming more and more important in the design of the display apparatus.

SUMMARY

Accordingly, an aspect of an exemplary embodiment provides a display apparatus, capable of easily improving the external appearance of the rear side of the display apparatus.

Additional aspects of the exemplary embodiments will be set forth in part in the description which follows and, in part, will be obvious from the description, or may be learned by practice of the disclosure.

In accordance with an exemplary embodiment, a display apparatus includes a display unit, a support and a cover. The display unit may be configured to display an image thereon. The support may be configured to support the display unit. The cover may be formed of a flexible sheet and configured to cover the support and a rear side of the display unit. The cover may be configured to cover the support in a state of being spaced apart from the support.

The cover may be formed of material capable of expansion and contraction.

The cover may be formed of fabric.

The cover may include a rear side cover part and a support cover part. The rear side cover part may be configured to cover the rear side of the display unit. The support cover part may integrally extend from the rear side cover part while having a cross section of a ring shape so that the support is disposed at an inside the support cover part.

An inner surface of the support cover part may be spaced apart from the support.

The support may extend while being inclined toward a front upper side, and the support cover part may extend from the rear side cover part toward a rear lower side of the support.

The display unit may be installed or connectable to an upper end of the support so as to enable a forward/backward rotation around a horizontal axis.

The display apparatus may further include a mount.

The lower end of the support may be installed at the mount so as to enable a forward/backward rotation around a horizontal axis.

The lower end of the support may be installed at the mount so as to enable a left/right rotation around a vertical axis.

The support may include a hollow cylinder, and a plunger movably installed at the hollow cylinder.

The display unit may include a rear case that forms the rear side of the display unit. The cover may include a reinforcing member disposed at a periphery of the rear side cover part to reinforce the periphery of the rear side cover part. The rear case may include a locking rib provided at a periphery of the rear case such that the reinforcing member is engaged or connectable with the locking rib. The support may include a locking hole which is lockable with the locking rib.

The display apparatus may further include a mount and a rotation member. The mount may be mounted on a horizontal surface and allow a lower end of the support to be connected thereto. The rotation member may be rotatably installed on the mount. The cover may include a wire that is provided in a ring shape and disposed at a lower end of the support cover part. The rotation member may include a mounting groove on which the wire is mounted.

The mounting groove may be provided in a circular ring shape.

In accordance with another aspect of the present disclosure, a display apparatus includes a display unit, a mount, a support and a cover. The display unit may be configured to display an image thereon. The mount may be configured to be mounted on a horizontal surface. The support may vertically extend to have a lower end thereof connected to the mount and an upper end thereof connected to the display unit. The cover may be formed of a flexible sheet and configured to cover the support and a rear side of the display unit.

The cover may be formed of material capable of expansion and contraction.

The cover may be formed of fabric.

The cover may include a rear side cover part and a support cover part. The rear side cover part may be configured cover the rear side of the display unit. The support cover part may integrally extend from the rear side cover part while having a cross section of a ring shape so that the support is disposed at an inside the support cover part.

The display unit may include a rear case that forms the rear side of the display unit. The cover may include a reinforcing member disposed at a periphery of the rear side cover part to reinforce the periphery of the rear side cover part. The rear case may include a locking rib provided at a periphery of the rear case such that the reinforcing member is engaged or connectable with the locking rib. The reinforcing member may include a locking hole which is lockable with the locking rib.

The mount may include a rotation member rotatably installed on the mount. The cover may include a wire provided in a ring shape and disposed at a lower end of the support cover part. The rotation member may include a mounting groove on which the wire is mounted.

According to an exemplary embodiment, a display apparatus is provided, the display apparatus includes: a support configured to support a display unit; and a cover formed of a flexible sheet and configured to cover the support, wherein the cover is configured to expand and contract according to a state of the support.

The cover comprises a support cover part that may have a cross section of a ring shape so that the support is disposed at an inside of the support cover part.

The support may extend while being inclined toward a front upper side of the support, and the support cover part may extend from the front upper side of the support toward a rear lower side of the support.

As described above, the rear side of the display unit is provided to be covered by a cover, the external appearance of the rear side of the display unit is easily modified or improved through the cover.

BRIEF DESCRIPTION OF THE DRAWINGS

These and/or other aspects of the exemplary embodiments will become apparent and more readily appreciated from the following description of the exemplary embodiments, taken in conjunction with the accompanying drawings of which.

DETAILED DESCRIPTION

Figure 1:
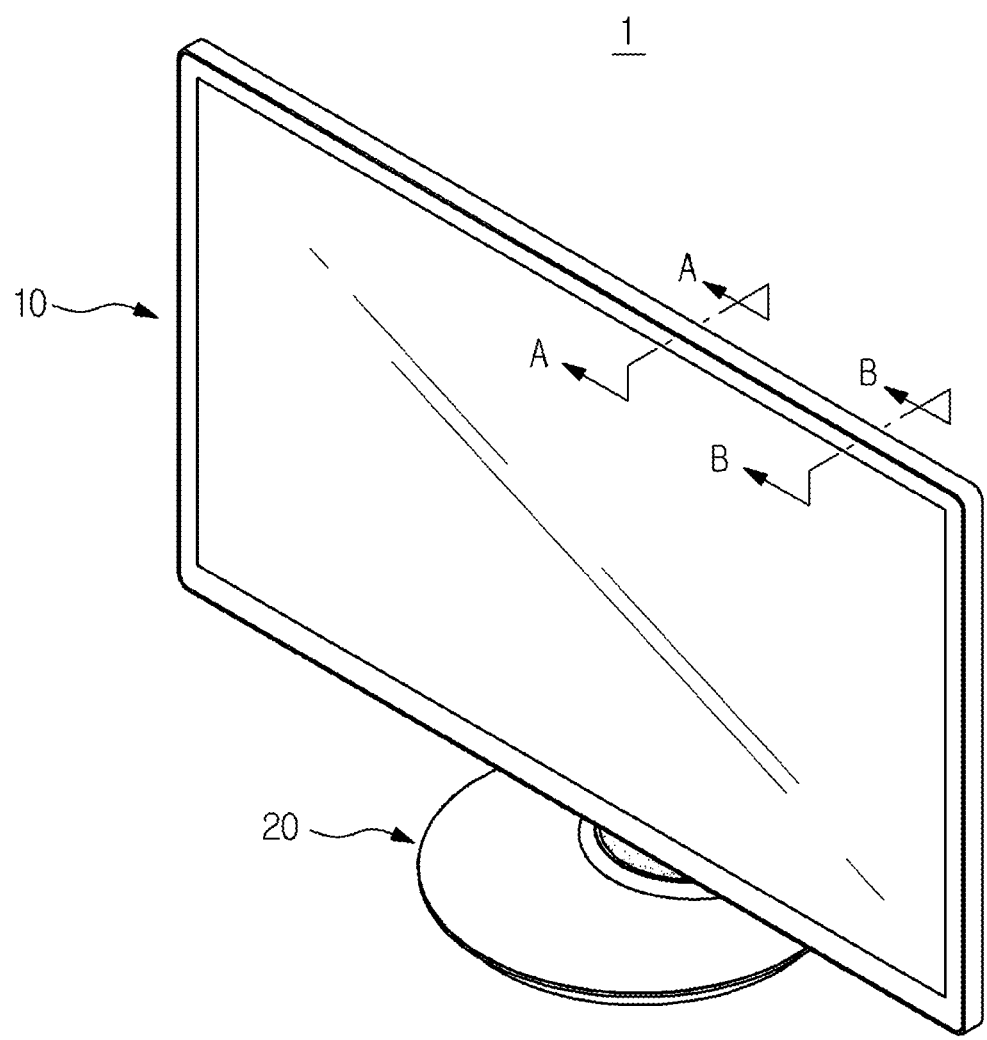
FIG. 1 is a perspective view illustrating a display apparatus in accordance with an exemplary embodiment.

Reference will now be made in detail to the exemplary embodiments, examples of which are illustrated in the accompanying drawings, wherein like reference numerals refer to like elements throughout.

Hereafter, a display apparatus in accordance with an exemplary embodiment will be described with reference to accompanied drawings.

Figure 2:
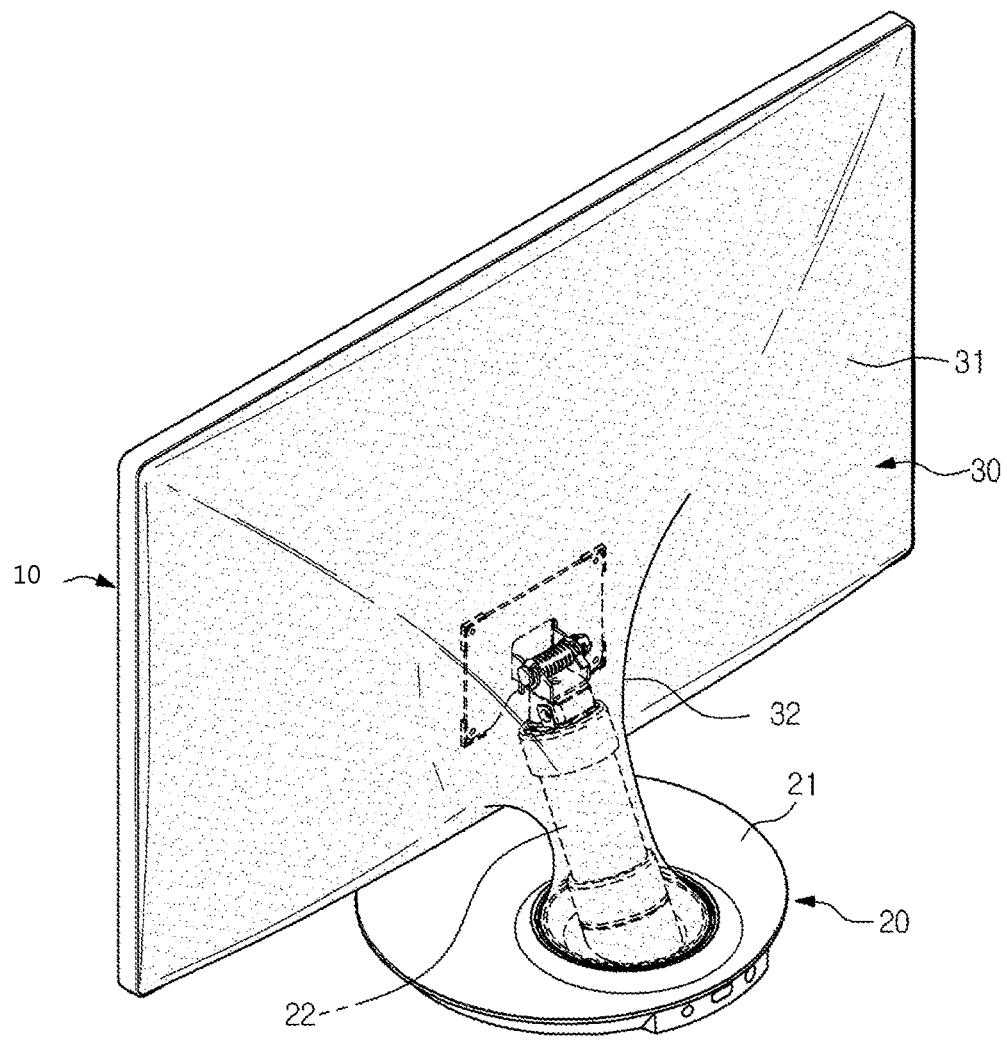
FIG. 2 is a rear side perspective view illustrating the display apparatus in accordance with an exemplary embodiment.

Referring to FIGS. 1 and 2, a display apparatus 1 includes a display unit 10 configured to display an image thereon, a stand 20 configured to support the display unit 10 while being mounted on a horizontal surface, such as an upper surface of a desk, and a cover 30 configured to cover a rear side of the display unit 10 in addition to a support 22, which is to be described later.

Figure 3:
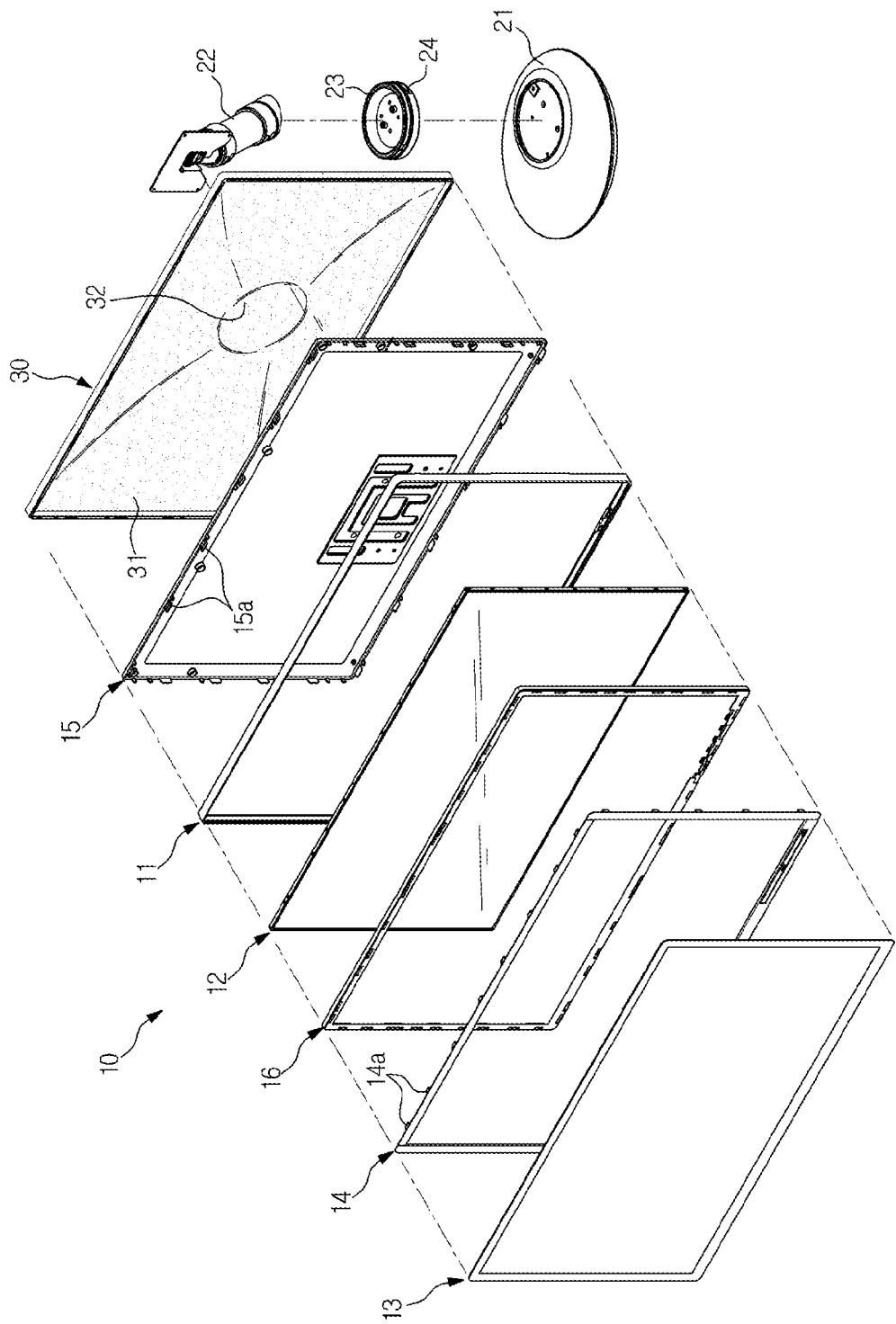
FIG. 3 is an exploded perspective view illustrating the display apparatus in accordance with an exemplary embodiment.

Referring to FIG. 3, the display unit 10 includes a main frame 11 forming a periphery of the display unit 10, a display panel 12 disposed at an inner side of the main frame 11 to display an image thereon, a glass panel 13 formed of transparent material to cover a front surface of the display panel 12, a glass bracket 14 to which the glass panel 13 is fixed, a rear case 15 disposed at a rear of the display panel 12 to cover the rear of the display panel 12, and a coupling frame 16 to which the display panel 12 is fixed and the glass bracket 14 and the rear case 15 are coupled.

The main frame 11 includes material having a light weight and superior strength, for example, aluminum, forming the periphery of the display unit 10.

The glass bracket 14 is provided in a rectangular ring corresponding to a periphery of the glass panel 13, and is attached to the periphery of a rear side of the glass panel 13.

Figure 4:
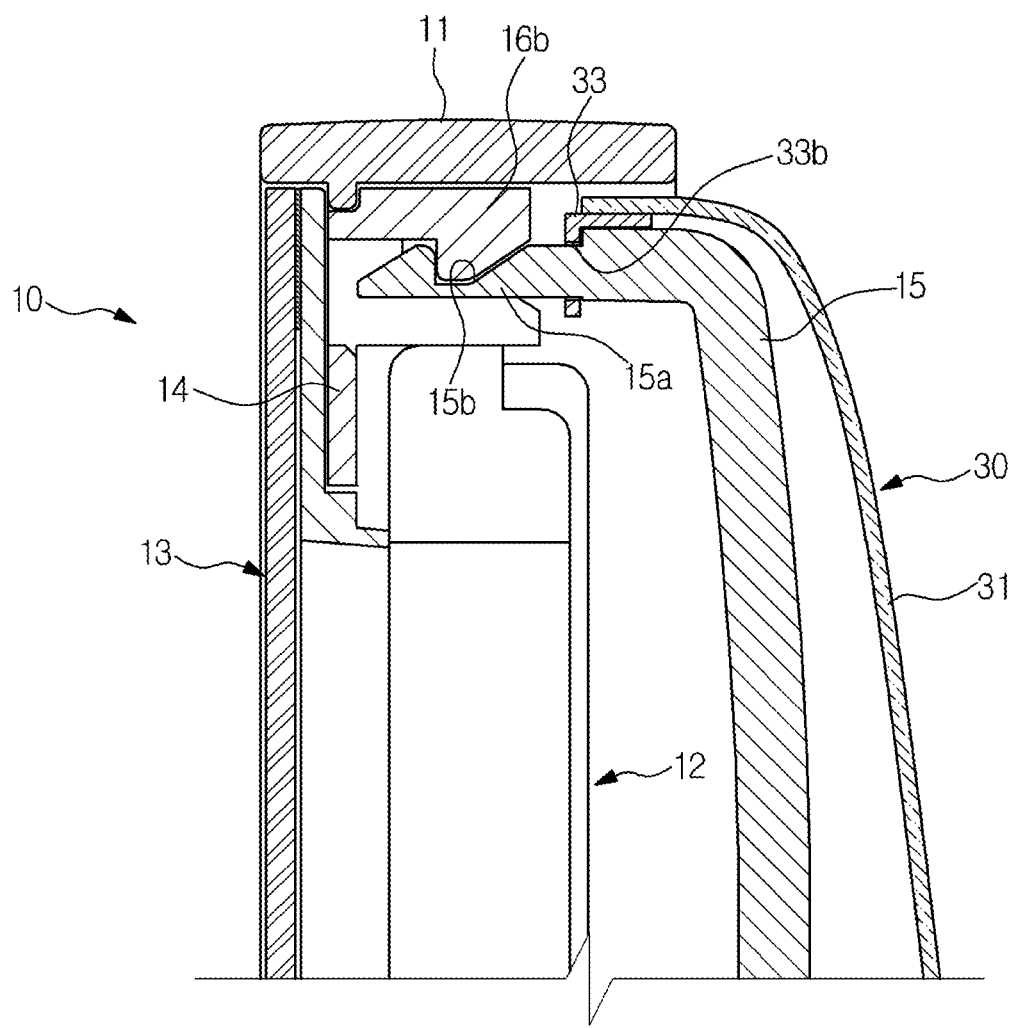
FIG. 4 is a cross sectional view taken along line A-A of FIG. 1.
Figure 5:
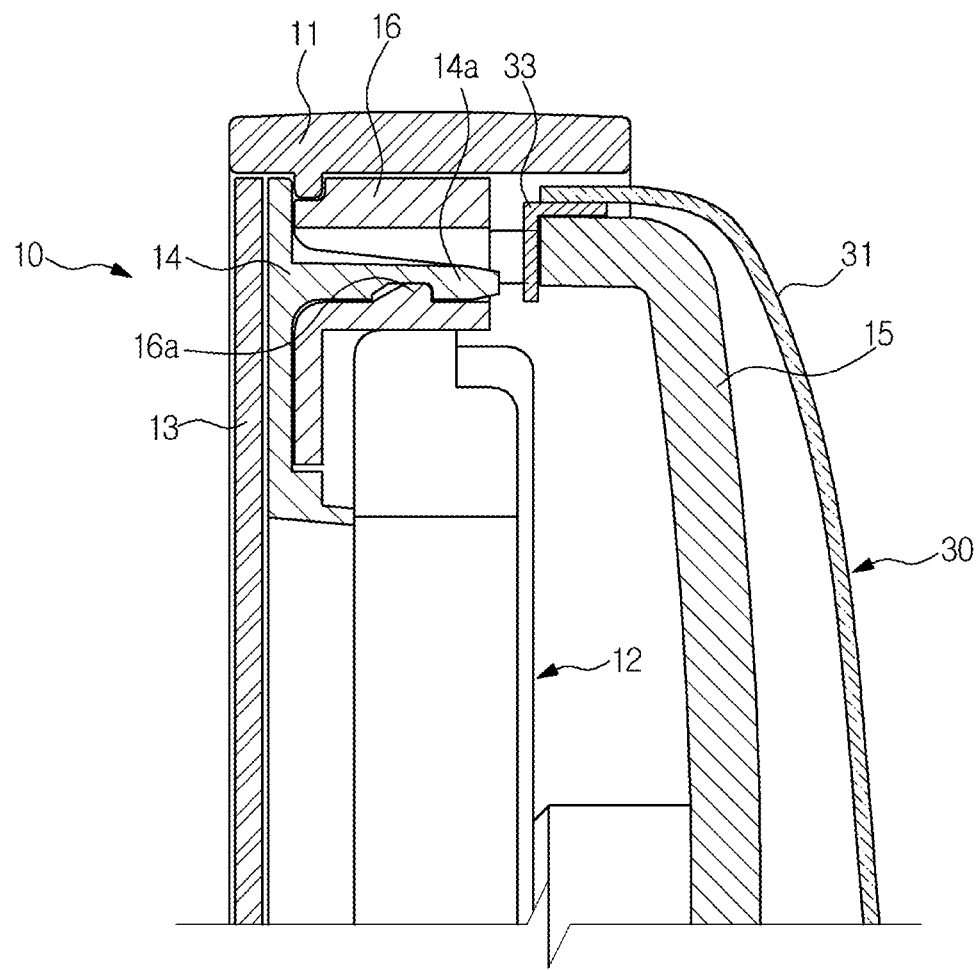
FIG. 5 is a cross sectional view taken along line B-B of FIG. 1.

Referring to FIGS. 4 and 5, the glass bracket 14 is provided at a rear surface thereof with a plurality of locking hooks 14a protruding toward a rear side, so that the glass bracket 14 is coupled to the coupling frame 16.

The rear case 15 is provided at a periphery thereof with a plurality of coupling parts 15a protruding toward a front side, so that the rear case 15 is coupled to the coupling frame 15. Each of the plurality of coupling parts 15a has a coupling groove 15b formed in a concaved manner.

The coupling frame 16 is provided in a rectangular ring shape corresponding to an inner surface of the main frame 11 and an outer surface of the display panel 12, so that the coupling frame 16 is fixed to the inner side of the main frame 11 and the display panel 12 is installed at the inner side of the coupling frame 16.

The coupling frame 16 comprises a plurality of locking steps 16a each provided at a position corresponding to each of the locking hooks 14a to be locked with the locking hook 14a, and a plurality of locking protrusion 16b each provided at a position corresponding to each of the coupling grooves 15b to be insertedly locked with the coupling groove 15b. Accordingly, the glass bracket 14 is coupled to the front side of the coupling frame 16, and the rear case 15 is coupled to the rear side of the coupling frame 16.

Referring again to FIG. 3, the stand 20 includes a mount 21 supported on a horizontal surface, such as an upper surface of a desk, where the display apparatus 1 is placed, and the support 22 configured to support the display unit 10 while being vertically extended to have an upper end connected to a rear side of the display panel 12 and a lower end connected to the mount 21. The support 22 in accordance with an exemplary embodiment is configured to extend while being inclined to a front upper side.

The display unit 10 in accordance with an exemplary embodiment of the present disclosure is configured to enable a forward/backward rotation along a horizontal axis, an ascending/descending movement and a left/right rotation along a vertical axis through the support 22.

Figure 6:
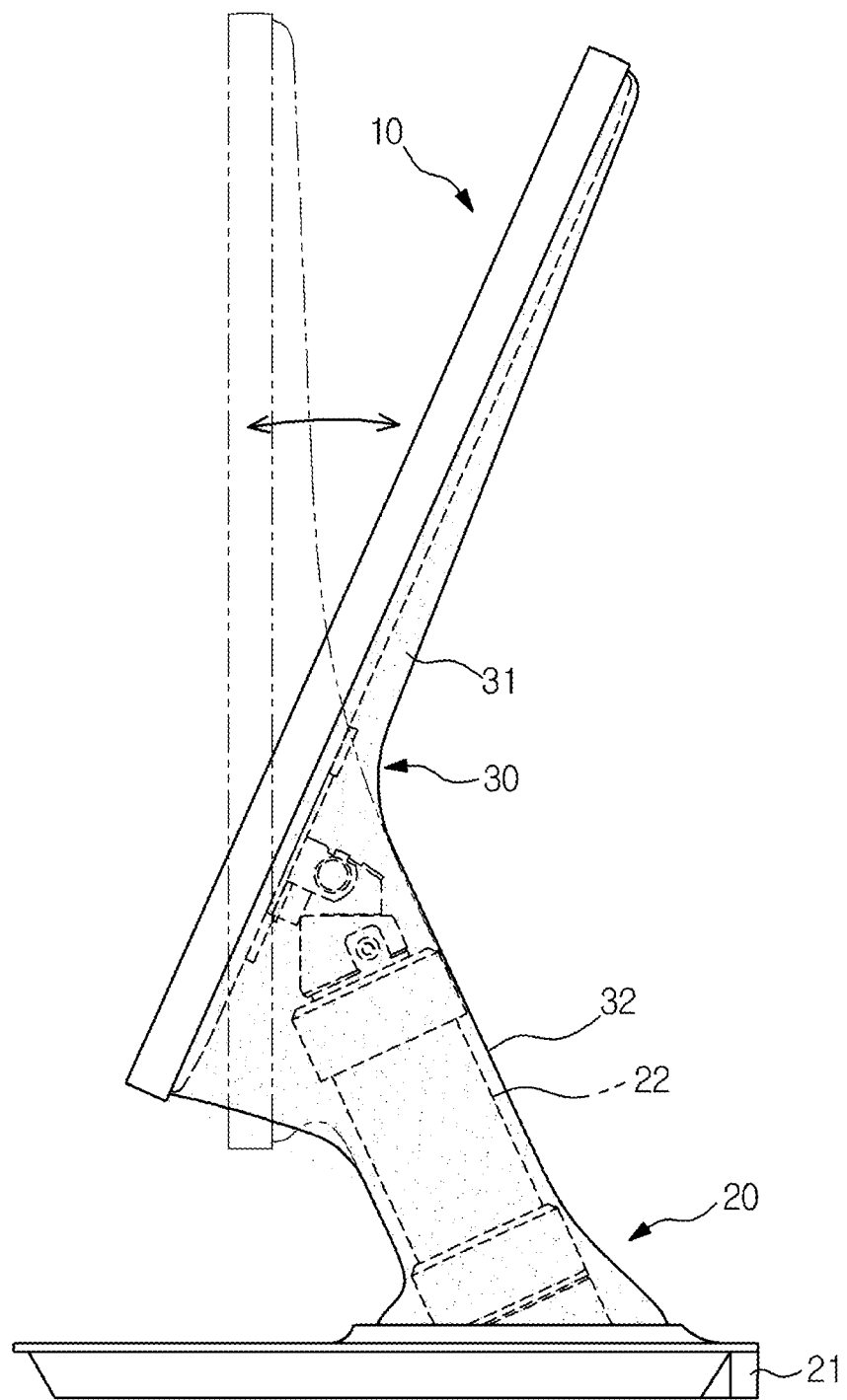
FIG. 6 is a side view illustrating the forward/backward rotation of a display unit of the display apparatus in accordance with an exemplary embodiment.

Referring to FIG. 6, for the forward/backward rotation of the display unit 10, the display unit 10 is installed at the upper end of the support 22 so as to enable a forward/backward rotation. Accordingly, the display unit 10 may rotate forward and backward.

Figure 7:
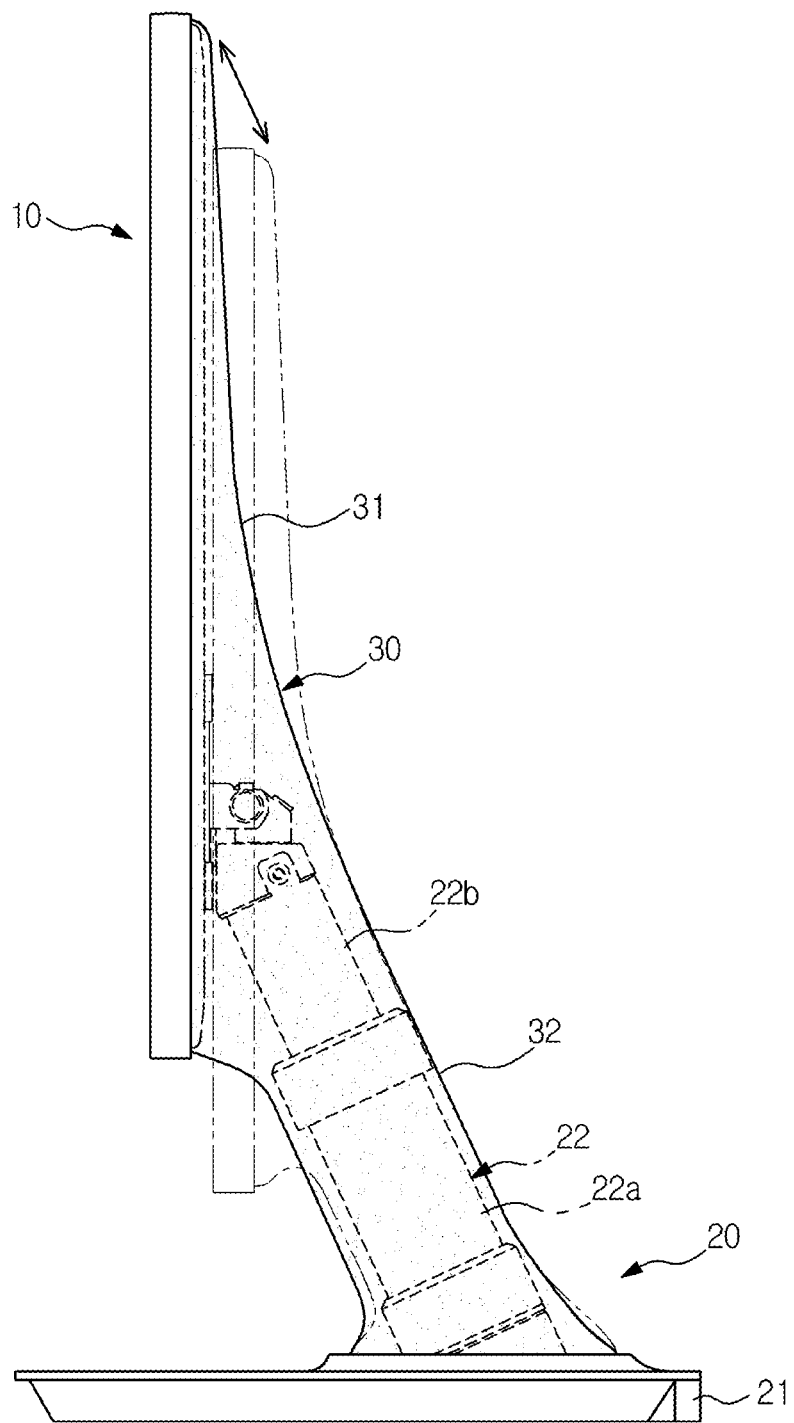
FIG. 7 is a side view illustrating the ascending/descending of a display unit of the display apparatus in accordance with an exemplary embodiment.

Referring to FIG. 7, the support 22 is configured to have a length thereof enabling expansion and contraction, so that the display unit 10 may be raised and lowered. To this end, the support 22 includes a cylinder 22a provided in the form of a cylinder, and a plunger 22b movably installed at the cylinder 22a. The cylinder 22a has a lower end installed at the mount 21, and the plunger 22b is movably installed in the cylinder 22a through an open upper end of the cylinder 22a while having an upper end thereof connected to the rear side of the display unit 10. As the plunger 22b moves, the overall length of the support 22 expands or contracts, and with the change of the length of the support 22, the display unit 10 moves up and down. Since the support 22 in an exemplary embodiment is disposed while being inclined to a front upper side, the display unit 10 may be raised and lowered while having an inclination corresponding to the support 22.

Figure 8:
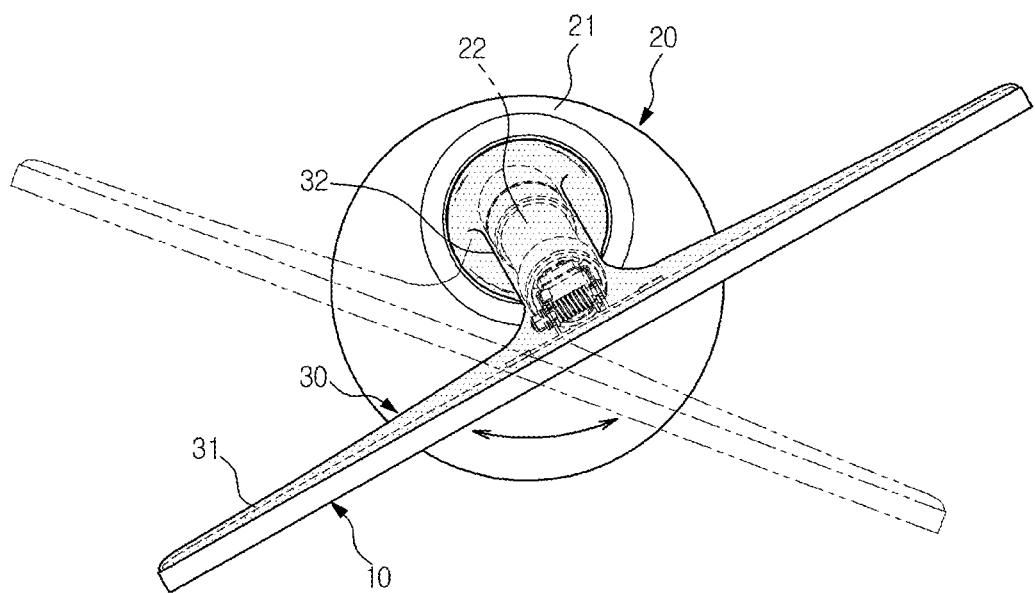
FIG. 8 is a plan view the left/right rotation of a display unit of the display apparatus in accordance with an exemplary embodiment.
Figure 9:
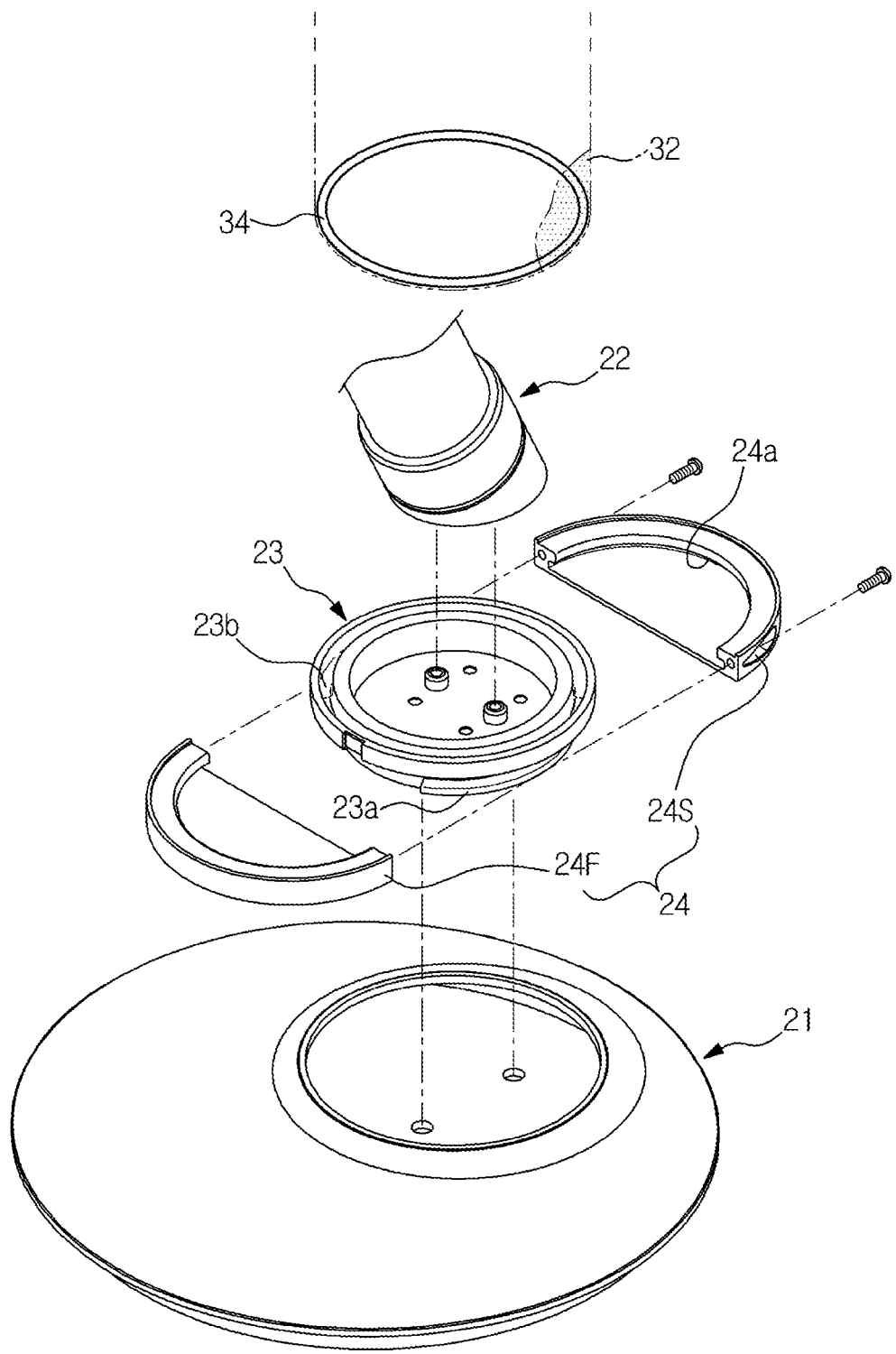
FIG. 9 is an exploded perspective view illustrating a coupling state of a support cover part and a rotation member of the display apparatus in accordance with an exemplary embodiment.

Referring to FIG. 8, for the left/right rotation of the display unit 10, the support 22 is rotatably installed at the mount 21. To this end, as shown in FIG. 9, the support 21 includes a rotation member having a circular shape, and a rotation guide 24 fixed to the mount 21 so as to rotatbly support the rotation member 23. The lower end of the support 22 is fixedly installed to the rotation member 23. The rotation guide 23 in accordance with an exemplary embodiment is provided at an inner circumferential surface thereof with a guide groove 24a extending in a circumferential direction thereof in a concaved manner. The rotation member 23 is provided at an outer circumferential surface thereof with a guide protrusion 23a extending in a circumferential direction thereof in a convex manner, so that the guide protrusion 23a is movably accommodated in the guide groove 24a. The rotation guide 24 includes two separate guides 24F and 24S each having a semi-circular shape, and when the separate guides 24F and 24S are coupled to each other, the rotation member 23 is rotatably installed between the separate guides 24F and 24S.

The cover 30 includes a flexible sheet that may be easily deformable. The cover 30 in accordance with an exemplary embodiment may include a fabric material. Referring again to FIG. 2, the cover 30 includes a rear side cover part 31 to cover the rear side of the display unit 10, and a support cover part 32 integrally extending from the rear side cover part 31 so as to cover the outer side of the support 22. Accordingly, the support 22 and the rear side of the display unit 10 are covered by the cover 30.

The cover 30, as described above, is formed of fabric, and the fabric is applied with various colors and complicated patterns through a dyeing or printing process. Accordingly, the cover 30 may enable the design of the rear side of the display apparatus 1 to be easily improved.

The cover 30 in accordance with an exemplary embodiment is provided in a rectangular shape corresponding to the display unit 10, and includes the rear side cover part 31 installed at the rear side of the display unit 10 to cover the rear side of the display unit 10, and the support cover part 32 integrally extending from the rear side cover part 31 toward a rear lower side while having an inclination corresponding to the support 22 so as to cover the outer side of the support 22.

Figure 10:
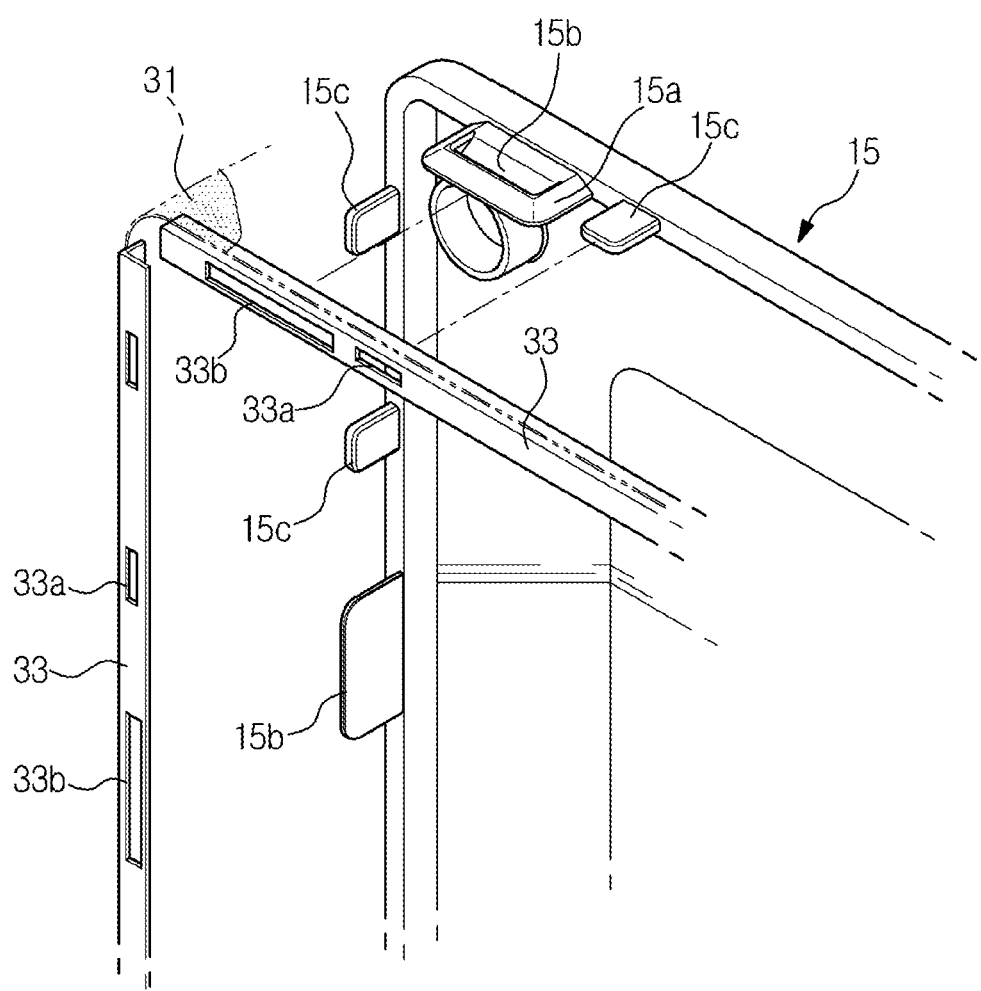
FIG. 10 is an exploded perspective view illustrating a rear side cover part and a rear case of the display apparatus in accordance with an exemplary embodiment.

Referring to FIG. 10, as to install the cover 30 at the display apparatus 1, a reinforcing member 33 is installed at a periphery of the rear side cover part 31 to reinforce the periphery of the rear side cover part 31, and a wire 34 bent in a ring shape is installed at the lower end of the support cover part 32 as shown in FIG. 9. The reinforcing member 33 is formed of material having a superior strength when compared to the cover 30 in order to support the periphery of the rear side cover part 31, while having a flexibility which facilitates the installation of the reinforcing member 33 at the display unit 10. In an exemplary embodiment, four units 33 of reinforcing member may be provided in correspondence with four edges of the display unit 10.

The reinforcing member 33 is installed at the rear case 15. To this end, the rear case 15 includes a plurality of locking ribs 15c that is provided at a periphery thereof to be engaged with the reinforcing member 33, and the reinforcing member 33 includes a locking hole 33a locked with the locking rib 15c. In addition, the reinforcing member 33 is provided with a through-hole 33b allowing the coupling part 15a to pass therethrough so that the coupling part 15a is coupled to the coupling protrusion 16b.

The lower end of the support cover part 32 is installed at the rotation member 23 through the wire 34. For the installation of the wire 34, a mounting groove 23b having a circular ring shape is provided at a periphery of the upper surface of the rotation member 23, so that the wire 34 is mounted on the mounting groove 23b together with the lower end of the support cover part 32. Since the mounting groove 23b in accordance with an exemplary embodiment is provided in a circular ring corresponding to the rotation member 23, the lower end of the support cover part 32 is deformed to correspond to the mounting groove 23b. Accordingly, the support cover part 32 is deformed into an approximate circular ring shape.

In addition, the mounting groove 23b has a diameter larger than that of the support 22 such that the support cover part 32 of the cover 30 covers the support 22 in a state of being spaced apart from the support 22. The support cover part 32 is deformed into a shape corresponding to the mounting groove 23b.

In a state that the outer part of the rear side cover part 31 is installed at the rear case 15, and the lower end of the support cover part 32 is installed at the rotation member 23, when the display unit 10 rotates or moves up and down, the cover 30 may interrupt the rotation and the up and down movement of the display unit 10. Accordingly, the cover is formed of expansion-contraction material so as to be deformed according to the rotation and the up and down movement of the display unit 10. That is, the cover 30 may be formed of expansion-contraction fabric.

Although the cover 30 in accordance with an exemplary embodiment is configured to cover the support 22 and the rear side of the display unit 10, the present disclosure is not limited thereto. According to another aspect of an exemplary embodiment, the cover 30 may cover only the rear side of the display unit 10.

Although the cover 30 in accordance with an exemplary embodiment is formed of expansion-contraction fabric, the present disclosure is not limited thereto. According to another aspect of an exemplary embodiment, the cover may be formed of other material capable of expansion and contraction through elastic deformation, such as rubber.

Although the display unit 10 in accordance with an exemplary embodiment includes the rear case 15, the present disclosure is not limited thereto. According to another aspect of an exemplary embodiment, the display unit 10 may have the rear side of the display panel 12 blocked by the cover 30 formed of flexible material, without including a configuration corresponding to the rear case 15. In this case, the cover 30 may include a fire-prevention treated fabric for the safety.

Although the description has been made in relation that the display unit 10 is able to perform the forward/backward rotation, the left/right rotation and the ascending/descending as an example, the exemplary embodiment is not limited thereto. According to another aspect of an exemplary embodiment, the display unit may selectively perform at least one of the forward/backward rotation, the left/right rotation and the ascending/descending.

Although the support 22 in accordance with an exemplary embodiment has a lower end fixedly installed at the mount 21, the present disclosure is not limited thereto. According to another aspect of an exemplary embodiment, the lower end of the support 22 may be installed at the mount 21 so as to enable a forward/backward rotation.

Although the display unit 1 in accordance with an exemplary embodiment is mounted on the upper surface of the desk through the mount 21 and the support 22, the present disclosure is not limited thereto. According to another aspect of an exemplary embodiment, the display apparatus may be installed at a wall through the support without having a configuration corresponding to the mount.

Although the mounting groove 23b in accordance with an exemplary embodiment is provided in the form of a circular ring so that the support cover part 32 has a circular ring shape, the present disclosure is not limited thereto. According to another aspect of an exemplary embodiment of the present disclosure, the mounting groove 23b may be provided in various shapes so that the support cover part 32 has various shapes.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A display apparatus, comprising:
   a display unit;
   a support mounted to a rear portion of the display unit to support the display unit, the display unit is rotatable with respect to the support; and
   a cover formed of a flexible sheet and configured to cover the support and a rear side of the display unit,
   wherein the cover is configured to cover the support in a state of being spaced apart from the support.

2. The display apparatus of claim 1, wherein the cover comprises a material capable of expansion and contraction.

3. The display apparatus of claim 1, wherein the cover comprises a fabric.

4. The display apparatus of claim 2, wherein the cover comprises a rear side cover part to cover the rear side of the display unit, and a support cover part integrally extending from the rear side cover part while having a cross section of a ring shape so that the support is disposed at an inside of the support cover part.

5. The display apparatus of claim 4, wherein an inner surface of the support cover part is spaced apart from the support.

6. The display apparatus of claim 4, wherein the support extends while being inclined toward a front upper side, and the support cover part extends from the rear side cover part toward a rear lower side of the support.

7. The display apparatus of claim 4, wherein the display unit is installed at an upper end of the support and enables a forward/backward rotation around a horizontal axis.

8. The display apparatus of claim 4, further comprising:
   a mount which is mountable on a horizontal surface and to which a lower end of the support is connected,
   wherein a lower end of the support is installed at the mount and enables a forward/backward rotation around a horizontal axis.

9. The display apparatus of claim 4, further comprising:
   a mount which is mountable on a horizontal surface and to which a lower end of the support is connected,
   wherein a lower end of the support is installed at the mount so as to enable a left/right rotation around a vertical axis.

10. The display apparatus of claim 4, wherein the support comprises a hollow cylinder, and a plunger movably installed at the hollow cylinder.

11. The display apparatus of claim 4, wherein
    the cover comprises a reinforcing member disposed at a periphery of the rear side cover part to reinforce the periphery of the rear side cover part, and
    wherein the reinforcing member is connectable with a locking rib of a rear case of the display unit, and the reinforcing member comprises a locking hole which is lockable with the locking rib.

12. The display apparatus of claim 4, further comprising:
    a mount which is mountable on a horizontal surface and to which a lower end of the support is connected; and
    a rotation member rotatably installed on the mount,
    wherein the cover comprises a wire provided in a ring shape and disposed at a lower end of the support cover part; and
    the rotation member comprises a mounting groove on which the wire is mounted.

13. The display apparatus of claim 12, wherein the mounting groove comprises a circular ring shape.

14. A display apparatus, comprising:
    a display unit;
    a mount configured to be mounted on a horizontal surface;
    a support vertically extending to have a lower end thereof connected to the mount and an upper end thereof connected to a rear portion of the display unit, the display unit is rotatable with respect to the upper end of the support; and
    a cover formed of a flexible sheet and configured to cover the support and a rear side of the display unit.

15. The display apparatus of claim 14, wherein the cover comprises material capable of expansion and contraction.

16. The display apparatus of claim 14, wherein the cover comprises a fabric.

17. The display apparatus of claim 14, wherein the cover comprises a rear side cover part configured to cover the rear side of the display unit, and a support cover part integrally extending from the rear side cover part while having a cross section of a ring shape so that the support is disposed at an inside the support cover part.

18. The display apparatus of claim 17, wherein:
    the display unit comprises a rear case that forms the rear side of the display unit;
    the cover comprises a reinforcing member disposed at a periphery of the rear side cover part to reinforce the periphery of the rear side cover part;
    the rear case comprises a locking rib provided at a periphery of the rear case such that the reinforcing member is engaged with the locking rib; and
    the reinforcing member comprises a locking hole to which the locking rib is locked.

19. The display apparatus of claim 17, wherein:
    the mount comprises a rotation member rotatably installed on the mount,
    the cover comprises a wire provided in a ring shape and disposed at a lower end of the support cover part, and
    the rotation member comprises a mounting groove on which the wire is mounted.

20. A display apparatus, comprising:
    a support mounted to a rear portion of a display unit to support the display unit, the display unit is rotatable with respect to the support; and
    a cover formed of a flexible sheet and configured to cover the support,
    wherein the cover is configured to expand and contract according to a state of the support.

21. The display apparatus of claim 20, wherein the cover comprises a support cover part having a cross section of a ring shape so that the support is disposed at an inside of the support cover part.

22. The display apparatus of claim 21, wherein the support extends while being inclined toward a front upper side of the support, and the support cover part extends from the front upper side of the support toward a rear lower side of the support.

* * * * *